(12) United States Patent
Carson et al.

(10) Patent No.: US 10,229,615 B2
(45) Date of Patent: Mar. 12, 2019

(54) CARDIAC SIMULATION DEVICE

(71) Applicant: Vascular Simulations, LLC, Wilmington, DE (US)

(72) Inventors: David Jeffrey Carson, Stuart, FL (US); Baruch B. Lieber, Aventura, FL (US); Chandramouli Sadasivan, Wilmington, DE (US); David Fiorella, East Setauket, NY (US); Henry Woo, Setauket, NY (US); Michael Romeo, Port St. Lucie, FL (US); Gary Bunch, Northport, NY (US); Karl Keppeler, Manorville, NY (US)

(73) Assignee: Vascular Simulations Inc., Wilmington, DE (US)

( * ) Notice: Subject to any disclaimer, the term of this patent is extended or adjusted under 35 U.S.C. 154(b) by 540 days.

(21) Appl. No.: 14/815,629

(22) Filed: Jul. 31, 2015

(65) Prior Publication Data

US 2016/0027345 A1  Jan. 28, 2016

Related U.S. Application Data

(63) Continuation-in-part of application No. 13/363,251, filed on Jan. 31, 2012, now Pat. No. 9,183,763.
(Continued)

(51) Int. Cl.
| G09B 23/30 | (2006.01) |
| G09B 23/28 | (2006.01) |
| G09B 23/32 | (2006.01) |

(52) U.S. Cl.
CPC ........... *G09B 23/303* (2013.01); *G09B 23/28* (2013.01); *G09B 23/288* (2013.01); *G09B 23/30* (2013.01); *G09B 23/32* (2013.01)

(58) Field of Classification Search
None
See application file for complete search history.

(56) References Cited

U.S. PATENT DOCUMENTS

| 2,684,684 A | 7/1954 | Stevenson |
| 3,376,660 A | 4/1968 | McGinnis |
| (Continued) | | |

FOREIGN PATENT DOCUMENTS

| JP | 2006276258 | 10/2006 |
| WO | WO2011094525 | 8/2011 |

OTHER PUBLICATIONS

Anonymous, "Endovascular Surgery Training-Evaluation-Simulation: EVE EndoVascular Evaluator", FAIN—Biomedical, Inc., Japan, Internet Article, http://www.fain-biomedical.com/fbm_wp/wp-content/themes/fbm_ns/images/pdf/eve_fbm_e.pdf, (retrieved Sep. 21, 2015).
(Continued)

*Primary Examiner* — James Hull
(74) *Attorney, Agent, or Firm* — McHale & Slavin, P.A.

(57) ABSTRACT

The present invention describes a device and system for simulating normal and disease state cardiovascular functioning, including an anatomically accurate left cardiac simulator for training and medical device testing. The system and device uses pneumatically pressurized chambers to generate ventricle and atrium contractions. In conjunction with the interaction of synthetic valves which simulate mitral and aortic valves, the system is designed to generate pumping action that produces accurate volume fractions and pressure gradients of pulsatile flow, duplicating that of a human heart. Through the use of a control unit and sensors, one or more parameters such as flow rates, fluidic pressure, and heart rate may be automatically controlled, using feedback loop mechanisms to adjust parameters of the hydraulic system simulate a wide variety of cardiovascular conditions includ-
(Continued)

ing normal heart function, severely diseased or injured heart conditions, and compressed vasculature, such as hardening of the arteries.

23 Claims, 14 Drawing Sheets

Related U.S. Application Data

(60) Provisional application No. 62/031,628, filed on Jul. 31, 2014.

(56) References Cited

U.S. PATENT DOCUMENTS

| | | | |
|---|---|---|---|
| 3,434,162 A | 3/1969 | Wolfe | |
| 3,541,612 A | 11/1970 | Carney | |
| 3,755,825 A | 9/1973 | DeBakey et al. | |
| 3,916,449 A | 11/1975 | Davis | |
| 4,687,424 A | 8/1987 | Heimes | |
| 5,052,934 A | 10/1991 | Carey et al. | |
| 5,374,194 A | 12/1994 | Walcerz et al. | |
| 5,632,623 A | 5/1997 | Kolff et al. | |
| 5,634,797 A | 6/1997 | Montgomery | |
| 5,766,207 A | 6/1998 | Potter et al. | |
| 6,062,866 A | 5/2000 | Prom | |
| 6,146,325 A | 11/2000 | Lewis et al. | |
| 6,205,871 B1 | 3/2001 | Saloner et al. | |
| 6,234,804 B1 | 5/2001 | Yong | |
| 6,336,812 B1 | 1/2002 | Cooper et al. | |
| 6,461,165 B1 | 10/2002 | Takashina et al. | |
| 6,517,354 B1 | 2/2003 | Levy | |
| 6,685,481 B2 | 2/2004 | Chamberlain | |
| 6,790,043 B2 | 9/2004 | Aboud | |
| 6,843,145 B2 | 1/2005 | Jaszczak et al. | |
| 7,018,327 B1 | 3/2006 | Conti | |
| 7,021,940 B2 | 4/2006 | Morris et al. | |
| 7,063,942 B2 | 6/2006 | Dancu et al. | |
| 7,083,418 B2 | 8/2006 | Baldauf | |
| 7,569,809 B2 | 8/2009 | Vija et al. | |
| 7,798,815 B2 | 9/2010 | Ramphal et al. | |
| 7,866,983 B2 | 1/2011 | Hemphill et al. | |
| 7,976,312 B2 | 7/2011 | Eggert et al. | |
| 7,976,313 B2 | 7/2011 | Eggert et al. | |
| 8,016,598 B2 | 9/2011 | Eggert et al. | |
| 8,342,852 B2 | 1/2013 | King | |
| 8,608,484 B2 | 12/2013 | Kalafut et al. | |
| 8,632,343 B2 | 1/2014 | Blackburn | |
| 8,636,519 B2 | 1/2014 | Schwartz et al. | |
| 8,678,830 B2 | 3/2014 | Gurdin et al. | |
| 2002/0009386 A1 | 1/2002 | Lindsay | |
| 2003/0088151 A1 | 5/2003 | Kung et al. | |
| 2003/0220718 A1 | 11/2003 | Jaszczak et al. | |
| 2004/0033477 A1 | 2/2004 | Ramphal et al. | |
| 2004/0092789 A1 | 5/2004 | Tsukahara et al. | |
| 2004/0101814 A1 | 5/2004 | Morris et al. | |
| 2005/0084834 A1 | 4/2005 | Baldauf | |
| 2005/0100873 A1 | 5/2005 | Meythaler et al. | |
| 2005/0130107 A1 | 6/2005 | Ellington et al. | |
| 2008/0020362 A1 | 1/2008 | Cotin et al. | |
| 2009/0226867 A1 | 9/2009 | Kalafut et al. | |
| 2009/0246747 A1 | 10/2009 | Buckman, Jr. | |
| 2010/0167251 A1 | 7/2010 | Boutchko et al. | |
| 2011/0165546 A1 | 7/2011 | May | |
| 2012/0034586 A1 | 2/2012 | Gomo | |
| 2013/0132054 A1 | 5/2013 | Sharma et al. | |
| 2013/0196301 A1 | 8/2013 | Carson et al. | |

OTHER PUBLICATIONS

Anonymous, "Comprehensive Endovascular Surgery Simulation", FAIN—Biomedical Inc., Japan, Internet Article, http://www.japan-product.com/ads/fain-biomedical-inc, pp. 3-5, (Retrieved from Internet Sep. 21, 2015, ).

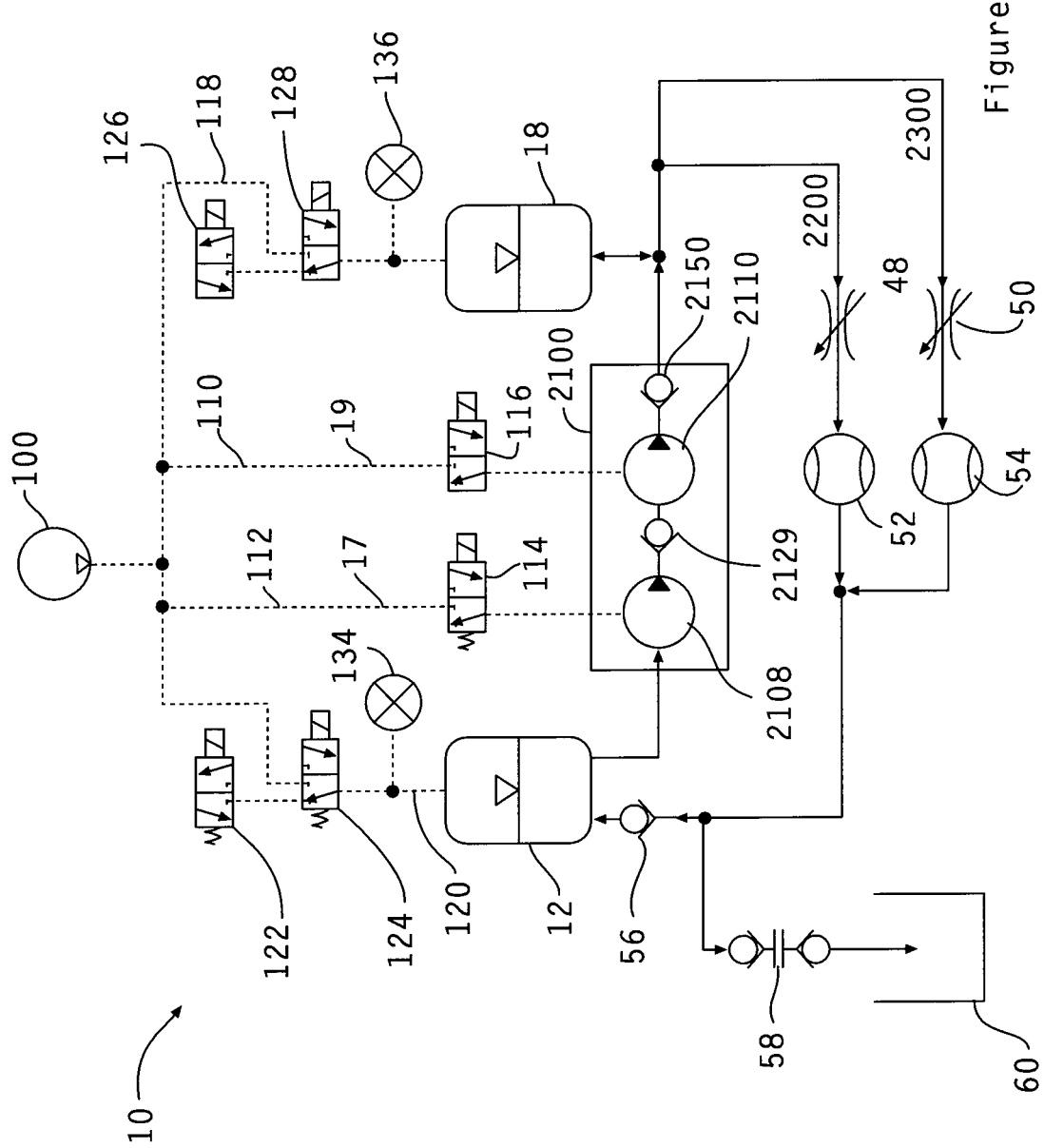

SECTION A-A

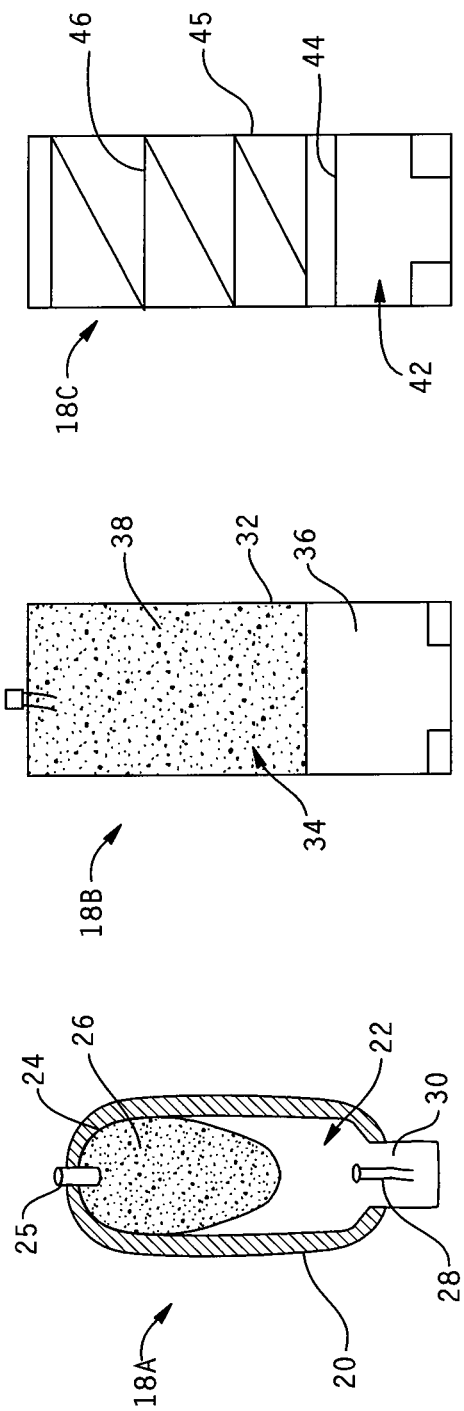

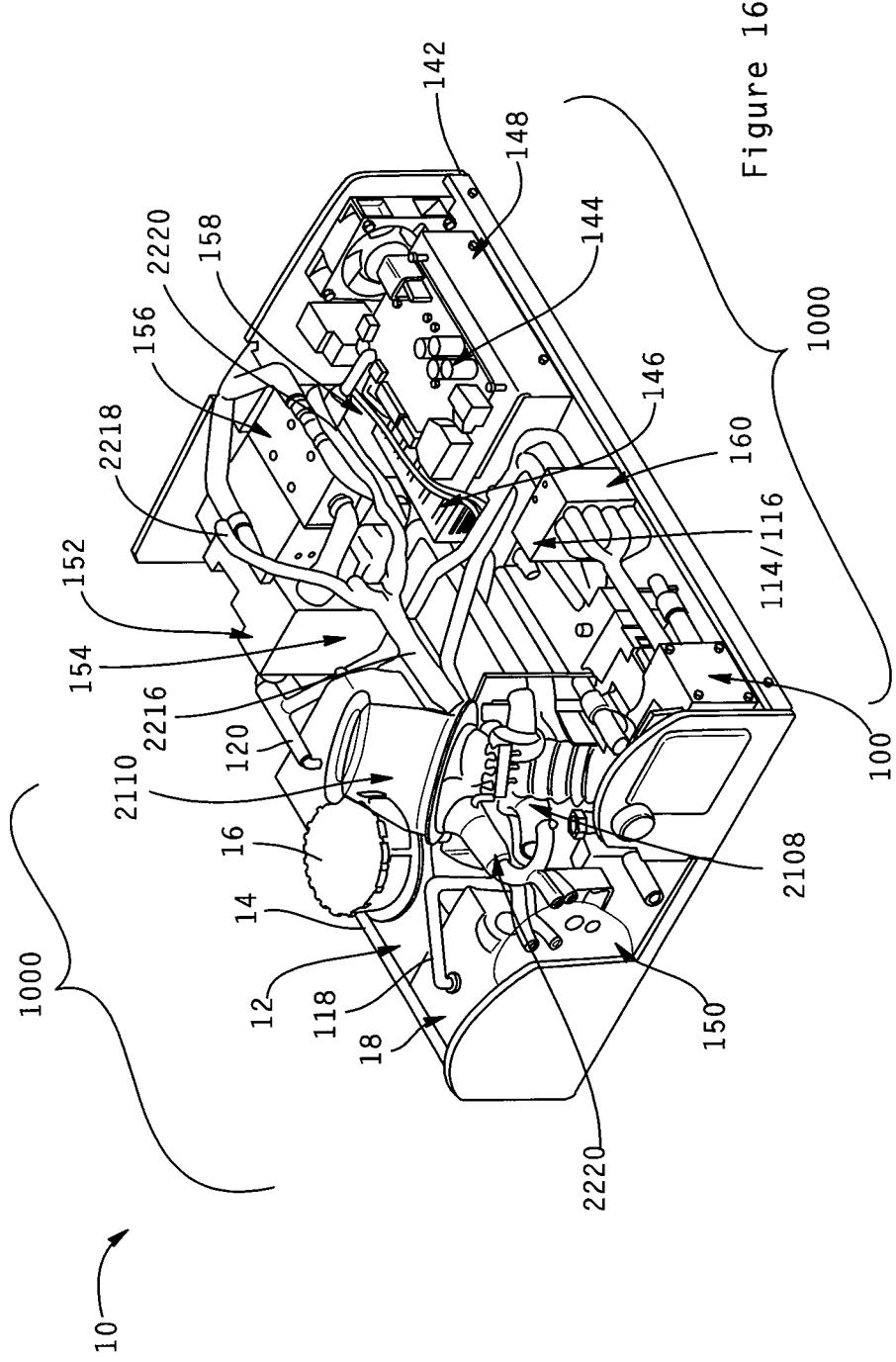

CARDIAC SIMULATION DEVICE

FIELD OF THE INVENTION

In accordance with 37 C.F.R 1.76, a claim of priority is included in an Application Data Sheet filed concurrently herewith. Accordingly, the present application is a continuation-in-part to U.S. patent application Ser. No. 13/363,251, filed on Jan. 31, 2012, entitled "CARDIAC SIMULATION DEVICE", now U.S. Pat. No. 9,183,763, issued on Nov. 15, 2015, and claims priority to U.S. Provisional Patent Application No. 62/031,628, filed on Jul. 31, 2014, entitled, "CARDIAC SIMULATION DEVICE." The contents of each of the above referenced applications or patents are herein incorporated by reference in its entirety.

FIELD OF THE INVENTION

This invention relates to a surgical simulation system, particularly to a cardiovascular simulation system; to a device and system for simulating normal and disease state cardiac and cardiovascular functioning, including an anatomically accurate left cardiac simulator for training and medical device testing; and more particularly to a device and system for simulating normal and disease state cardiac and cardiovascular functioning which uses sensors and other control mechanisms to automatically adjust hydraulic and/or pneumatic components of the system to achieve physiologically representative pressure and flow profiles through the heart and major or arteries.

BACKGROUND OF THE INVENTION

Cardiovascular disease, diseases affecting the heart and the vasculature, and vascular disease, diseases affecting the circulatory system, are prevalent conditions affecting millions of individuals across the globe. While vasculature disease may manifest in the hardening of arterial walls at a specific location, such disease state affects every organ in the human body. Several options exist to alleviate or minimize the risk associated with prolonged vasculature disease states. Depending on the severity, changes in life style, i.e. diet and increased exercise, or the use of drugs may be helpful. Where these options will not work or where the disease is severe, surgical intervention remains the primary treatment tool. Traditional surgical procedures have been steadily replaced with more minimally invasive endovascular techniques, and minimally invasive advances in endovascular technology are altering the way surgeons treat vascular diseases.

While vascular surgical procedures are safer than ever, complex vascular surgical procedures can result in collateral damage to the patient. While no surgery is without risk, the level of skill of the surgeon and his/her team, as well as the ability to minimize unforeseen surprises when performing the surgical procedure is paramount to preventing complications and/or death to the patient. Experienced surgeons having performed numerous vascular disease procedures are much more likely to complete such surgical procedures with fewer complications than those surgeons having less experience. While such experience is gained by training and performing numerous procedures, the number of surgical procedures available is a limiting factor. Accordingly, not every surgeon will have the same opportunity to perform the number of surgical procedures needed to obtain a skill level that minimizes the risks of the procedures undertaken. Moreover, as new procedures are developed, senior surgeons may find it difficult to obtain the necessary experience needed.

Training devices for practicing various surgical procedures have been used by surgeons to improve skills and are known in the art. For example, U.S. Pat. No. 8,016,598, U.S. Pat. No. 7,976,313, and U.S. Pat. No. 7,976,312 describe patient simulator systems for teaching patient care. U.S. Pat. No. 7,798,815 discloses an electromechanical pumping system for simulating the beating of a heart in a cardiac surgery training environment. U.S. Pat. No. 7,866,983 discloses a surgical simulator for teaching, practicing, and evaluating surgical techniques. The simulator is described as comprising a cassette of organs, blood vessels, and tissues that may be disposable.

U.S. Pat. No. 7,083,418 discloses a model for teaching or illustrating surgical and/or medical technique. The system is described as having a base component representing tissue or an organ, and several components structured and arranged to be coupleable to and detachable from the base component and/or to each other, to illustrate different positions of the components with respect to one another, representing different phases in surgical and/or medical techniques.

U.S. Pat. No. 7,063,942 discloses a system for hemodynamic simulation. The system is described as comprising a vessel having properties of a blood vessel, a reservoir containing a quantity of fluid, tubing connecting the vessel and reservoir, and at least one pump for circulating the fluid within the system.

U.S. Pat. No. 6,843,145 discloses a cardiac phantom for simulating a dynamic cardiac ventricle. The phantom is described as comprising two concentrically disposed, fluid-tight, flexible membranes defining a closed space between the walls of the membranes.

U.S. Pat. No. 6,685,481 discloses a training device for cardiac surgery and other similar procedures. The device is described as including an organ model such as a cardiac model, an animation network adapted to impart to the model a motion similar to the corresponding natural organ, and a control device used to control the operation of the animation network. The cardiac model is described as being made of two sections, an inner cast simulating the myocardium and an external shell simulating the pericardium.

U.S. Pat. No. 5,052,934 discloses an apparatus to serve as a phantom for evaluation of prosthetic valves and cardiac ultrasound procedures, wherein a controlled pulsatile flow of a blood-mimicking fluid is passed through a multi-chambered region into which are mounted mitral and aortic valves and adjustably positionable ultrasound transducers.

While such training devices are known in the art, the device and system for simulating normal and disease state cardiovasculature functioning in accordance with the present invention provides a training tool that is not only more anatomically correct than prior art devices, but also provides physiologically correct pressure and flow profiles in the major arteries of the cardiovascular system; the profiles of which differ at various arterial locations at the same instant throughout the cardiovascular system as thought, for example, by Cooney (Biomedical Engineering Principles—An Introduction to Fluid, Heat, and Mass Transport Processes, by David Cooney, Marcel Dekker, Inc. 1976 pp. 76-80). To achieve correct physiological pressure and flow, the heart and the vasculature have to work in unison (Hemodynamics, William. R. Milnor, Williams & Wilkins 1989 pp. 290-293); geometrical landmarks, such as major bifurcations, have to be placed at appropriate distances from the pumping heart, and the elasticity of the arteries has to represent that of actual vessels (Hemodynamics, William R. Milnor, Williams & Wilkins 1989 pp. 225-259). Furthermore, the implemented control mechanism provides automatic adjustment of one or more functioning elements, i.e. resistance valves or compliance chambers, to provide more accurate and representative pressure and fluid flow profiles, thereby providing a mechanism reduce collateral damage associated with cardiovasculature procedures.

SUMMARY OF THE INVENTION

The present invention describes a device and system for simulating normal and disease state cardiac and vascular functioning, including anatomically accurate elements, i.e. left heart and blood vessels, for training and medical device testing. The system and device uses pneumatically pressurized chambers to generate ventricle and atrium contractions. In conjunction with the interaction of synthetic mitral and aortic valves, the system is designed to generate pumping action that produces accurate volume fractions and pressure gradients of pulsatile flow, duplicating that of a human heart. The present system further uses one or more sensors or meters to monitor and/or change one or more characteristics of the system. For example, various sensors are used to control or provide proper representations of systolic and/or diastolic pressures as desired. Flow meters for determining and/or modifying flow rates throughout the system may be utilized as well. As such, one or more feedback loops are used to adjust such characteristics, thereby allowing for a more accurate representation of the circulatory system. One or more control units or components are provided for controlling the overall functioning of the system. By providing a control unit that automatically changes one or more functioning components of the system, pressure and flow profiles can be generated without the need of manual adjustment.

The cardiovasculature training and evaluation simulator system and device suitable for training and testing medical devices is adapted to provide an anatomically and physiologically accurate representation of a cardiovasculature system in normal or diseased states. In an illustrative embodiment, the system comprises a pneumatically driven cardiac module for simulating cardiac functioning of a patient, vasculature system module fluidly connected to the cardiac module and adapted for simulating the vasculature of a patient, and a control component operatively coupled to the cardiac module and the vasculature system module. The cardiac module comprises an atrium assembly for simulating an atrium of a heart and a ventricle assembly for simulating a ventricle of a heart. The cardiac module is adapted to operate by air pressure, independently acting on components that represent the left ventricle and atrium. Alternatively, the cardiac module may simply contain one or more pumps. A control unit controls or modifies one or more operational parameters of the system, including heart rate, ejection fraction, systemic vascular resistance and compliance and temperature. By modifying the systems parameters, pathological hemodynamic states, including but not limited to sepsis, hyperdynamic therapy with vasopressor agents, or cardiac arrhythmias, such as atrial fibrillation or flutter, can be recreated. The system may also contain replication of other body components, preferably the cerebrovasculature.

The system and devices therefore provide a mechanism that can be used to reduce collateral damage to patients undergoing vascular surgeries resulting from surgeon inexperience or inexperience with complex procedures. By providing a device that replicates the heart and vasculature, the surgeon can perform endovascular procedures prior to having perform such procedures the actual patient. Device selection, placement, and optimization can therefore be determined prior to actual surgery, eliminating the risk associated with having to do such tasks during a live procedure.

In one illustrative embodiment, a system for simulating the cardiovascular system of a human or other mammal, in which one or more operational parameters are automatically controlled without the need for manual adjustments, comprises a control unit operatively coupled to a closed loop pneumatic circuit configured to simulate cardiovascular functioning of a human or other mammal and a closed loop hydraulic circuit configured to simulate cardiovascular functioning of a human or other mammal. The control unit has one or more components configured to receive or process data and cause at least one functional component to function based on said data received or processed. At least one sensor is configured to control one or more parameters of said closed loop pneumatic circuit, or at least one sensor is configured to control one or more parameters of the closed loop hydraulic circuit. The control unit is configured to provide physiologically accurate representation of a cardiovasculature system in normal or diseased states whereby one or more operational parameters are automatically controlled without the need for manual adjustments. The system may also include a cardiac system module comprising an atrial actuator and a ventricle actuator, a vasculature system module comprising at least one tubing adapted to have characteristics of a human or other mammal artery or vein and fluidly connected to at least a portion, of said cardiac system module, and a head region. A fluid reservoir and compliance chamber may also be utilized.

Accordingly, it is a primary objective of the present invention to provide a device and system for simulating normal and disease state cardiac and cardiovascular functioning.

It is a further objective of the present invention to provide a device and system for simulating normal and disease state cardiovascular functioning including an anatomically accurate cardiac and cardiovascular simulator for training and medical device testing.

It is yet another objective of the present invention to provide a device and system for simulating normal and disease state cardiovascular functioning designed to generate pumping action that produces accurate volume fractions duplicating that of a heart.

It is a further objective of the present invention to provide a device and system for simulating normal and disease state cardiovascular functioning designed to provide pressure gradients of pulsatile flow that duplicates that of a heart and/or vascular elements.

It is yet another objective of the present invention to provide a device and system for simulating normal and disease state cardiovascular function which controls air pressure level, fluid pressure, and heart rate, thereby inducing contractions that simulate a wide variety of heart conditions.

It is a still further objective of the invention to provide a device and system for simulating normal cardiovascular functioning which controls air pressure level, fluid pressure, and heart rate induce contractions that simulate a wide variety of heart conditions having normal heart functions.

It is a further objective of the present invention to provide a device and system for simulating disease state cardiovascular functioning which controls air pressure level, fluid pressure, and heart rate to induce contractions that simulate a wide variety of heart conditions having diseased or injured heart conditions.

It is a further objective of the present invention to provide a training and evaluation simulator system and device suitable for training and testing medical devices which is adapted to provide an anatomically and physiologically accurate representation of a cardiovasculature system in normal or diseased states.

It is yet another objective of the present invention to provide a training and evaluation simulator system and device having a control module adapted for controlling or modifying one or more operational parameters of the system, including heart rate, temperature of the fluid such as a blood analog fluid, ejection fraction, systemic vascular resistance and compliance.

It is a still further objective of the invention to provide a training and evaluation simulator system and device in which pathological hemodynamic states, including but not limited to sepsis, hyperdynamic therapy with vasopressor agents, or cardiac arrhythmias, such as atrial fibrillation or flutter can be recreated.

It is a further objective of the present invention to provide a training and evaluation simulator system and device which allows a surgeon to perform endovascular procedures prior to having to perform such procedures on the actual patient.

It is yet another objective of the present invention to provide a training and evaluation simulator system and device which allows a surgeon to determine device selection, placement, and optimization prior to actual surgery, eliminating the risk associated with having to do so during a live procedure.

It is a further objective of the present invention to provide a device and system for simulating normal and disease state cardiovascular function which utilizes feedback control mechanisms to achieve physiological representative biological profiles.

It is a further objective of the present invention to provide a device and system for simulating normal and disease state cardiovascular function which utilizes systems to automatically adjust fluidic elements to achieve physiological representative biological profiles.

It is a further objective of the present invention to provide a device and system for simulating normal and disease state cardiovascular function which utilizes systems to automatically control flow of fluid via pumping mechanisms to achieve physiological representative biological profiles.

It is a further objective of the present invention, to provide a device and system for simulating normal and disease state cardiovascular function which utilizes feedback control and automatic adjustment of fluid elements and pump control to achieve physiologically representative temperature, pressure and flow profiles.

It is a further objective of the present invention to provide a control unit for controlling a cardiovascular simulation device using closed loop pneumatic and hydraulic circuits.

It is a further objective of the present invention to provide a control unit operatively coupled to a closed loop pneumatic circuit configured to simulate cardiovascular functioning of a human or other mammal and a closed loop hydraulic circuit configured to simulate cardiovascular functioning of a human or other mammal, where the control unit contains one or more components for receiving or processing data and for causing at least one functional component of a cardiovascular simulation device or system to function based on said data received or processed.

It is a further objective of the present invention to provide a system or device for simulating the cardiovascular system of a human in which one or more operational parameters are automatically controlled without the need for manual adjustments.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2 is a block diagram as shown in FIG. 1 including the pneumatic circuit of the simulator system in accordance with an illustrative example of the present invention;

FIG. 13 illustrates a gas charged accumulator;

FIG. 14 illustrates a gas charged piston accumulator;

FIG. 15 illustrates a spring-loaded piston accumulator; and

FIG. 16 illustrates an embodiment of the cardiovascular simulator system.

DETAILED DESCRIPTION OF THE INVENTION

Figure 1:
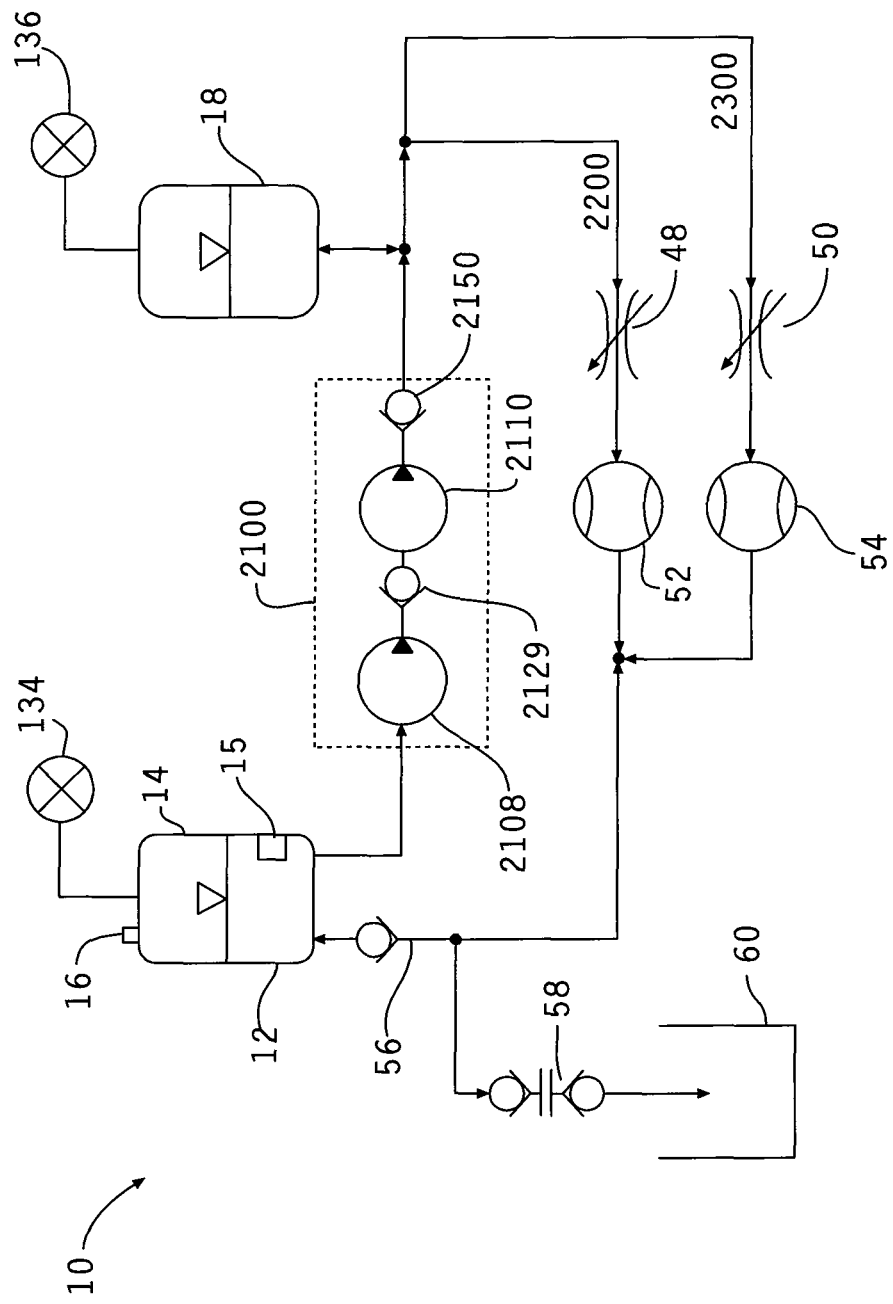
FIG. 1 is a block diagram of the hydraulic circuit of the simulator system in accordance with an illustrative example of the present invention.

Referring to FIGS. 1-3, schematic block diagrams of the simulator system, generally referred to as a cardiovascular simulator system 10, are illustrated. The cardiovascular simulator system 10 is illustrated and described as a cardiovascular system. However, the simulator system is not limited to the cardiovascular system and can be adapted to replicate other systems. The cardiovascular simulator system 10 comprises one or more modules, including a hardware component module and an anatomical component module. The hardware component module and the anatomical component module interact in a manner to provide a system which is an anatomically and functionally accurate replication of a body system, i.e. cardiac and/or vasculature system. Providing such an anatomically correct system provides the user a unique tool to practice and train for various surgical procedures and/or techniques prior to having to perform such actions on a living system. While such system will be described using human anatomy and systems, the vascular simulator system in accordance with the instant, invention can be adapted to replicate or model other organism systems such as other mammals, including domesticated animals such as dogs and cats, rodents such as mice and rats, livestock such as cattle, horses, sheep, swine/porcine, or wild animals such as lions or tigers.

Both the hardware component module, referred to generally as 1000 and the anatomical module, referred to generally as 2000, further contain sub-modules. The sub-modules comprise individual components that drive the system and/or provide accurate structural and functional replication of a living system. As will be described in greater detail, the hardware component module 1000 contains one or more sub-modules including a pneumatics component, a hydraulics component, and a control/electronics component. The cardiovascular simulator system 10 is designed to include or more feedback loops configured to provide accurate and automatic representation of several important components or characteristics of the system, i.e., physiologically representative operation of the cardiovasculature and cerebrovasculature, including flow rate and valve operations. The control unit contains the necessary hardware and monitoring devices to provide automatic manipulation of the system to provide predetermined characteristics of blood flow or pressure. The control unit may include pressure sensors, to represent arterial and venous pressure, and/or flow sensors to represents cephalic and thoracic flow in order to monitor and provide physiological values of pressure and flow within the system. Information obtained from the pressure and flow sensors are used as part of feedback control mechanisms to achieve physiologically representative characteristics. One or more valves may also be used to provide control of fluid flow in the system. The anatomical module 2000, illustrated herein as a cardiovasculature system, is primarily made up of three sub modules, including a cardiac simulator module 2100, a vasculature simulator module 2200, and one or more peripheral organ/systems simulator module 2300.

The cardiac module 2100 is configured to be a replica of the left half of the human heart. Air pressure drives the functioning of the components of the cardiac module 2100. In this aspect, fluid flow within and out of the cardiac module 2100 may be controlled, using the control unit 130, by the timing of air pressure application and by the speed of a pressurized air generating device, such as an air compressor. Control and/or manipulation of the air pressure application timing and the speed of a pressurized air generating device is a result of measuring and monitoring values as part of a feedback system. Feedback control loops may also be used for other functional aspects of the cardiovascular simulator system 10. For example, fluid pumps, such as motor driven pumps, used to drive fluid flow within the system can be manipulated, i.e. speed profiles modified, in response to feedback information from any sensors or other monitoring devices.

As illustrated in FIGS. 1-3, and 16, the system is a closed loop system designed to replicate the closed loop circulatory system of a human or other animal. The cardiovascular simulator system 10 includes a fluid reservoir (also known as a venous chamber) 12 which is fluidly connected to a first portion of the anatomical module 2000, a cardiac simulator module 2100. The fluid reservoir or venous chamber 12 comprises a housing unit 14 which is sized and shaped to receive and hold a fluid. Within the housing unit 14, the fluid reservoir or venous chamber 12 may contain one or more heating mechanisms, such as heating coils 15 that allow for the fluid within the cardiovascular simulator system 10 to be warmed to a predetermined temperature which corresponds to the physiological fluid temperatures within a body. The fluid may be any liquid that simulates blood. In an illustrative embodiment, the fluid is a clear blood analog having properties which duplicate the viscosity of human blood and mimics the friction coefficients as endovascular devices, wires, and catheters traverse the vasculature system. Alternatively, the fluid can be whole blood, or may simply utilize water. Accordingly, any fluid can be used and modified to have the viscosity and/or flow rate that is the same as or approximates that of blood flow through veins or arteries. The fluid could be clear, or may include a dye so that the fluid flow can be visualized throughout the system. A fill cap 16 is used to add a fluid, such as water, to the cardiovascular simulator system 10. The fluid reservoir or venous chamber 12 can be sealed and pressurized to provide a baseline pressure, replicating the venous pressure, to affect passive filling of the cardiac simulator module 2100. The top fluid reservoir or venous chamber 12 may contain indicators, such as a gauge (not illustrated), or a window may be unitized to provide visual, confirmation of flow level. Alternatively, sensor may be used and coupled to the control unit (control unit described later) to provide indications of high, low, or appropriate fluid levels.

The cardiovascular simulator system 10 is designed to replicate the blood flow from the left side of the heart out to other parts of the body. As such, the cardiac simulator module 2100 could include pumps which are designed to push fluid out of the module and into other components of the cardiovascular simulator system 10, thereby replicating the flow of blood through the left atrium and the left ventricle. Alternative to the use of simple pumps, an embodiment of the cardiac simulator module 2100 which includes replicas of the anatomy of the heart may be used, see FIGS. 4-10. As illustrated in the figures, the cardiac simulator module 2100 comprises several chambers representing the left side of the heart, and includes an atrial actuator, illustrated herein as a left atrium assembly 2108, and a ventricle actuator, illustrated herein as a left ventricle assembly 2110. The atrium and the ventricle may be molded using a standard size and shape. Preferably, the present invention uses an atrium and a ventricle that have, been molded using Computer Tomography (CT Scan) imagery of a heart as well as its vasculature. The left atrium assembly 2108 and left ventricle assembly 2110 can be molded to represent the exact size and shape analogous to that of individual patients.

The left atrium assembly 2108 pneumatically connects the pneumatics module, illustrated as a compressor 100 through tubing 17 and 19 (see FIG. 2). The pneumatics module contains the necessary components to provide one or more modules of the cardiovascular simulator system 10 with compressed air. The compressed air generated allows one or more of the components of the cardiac simulator module 2100, which is pneumatically connected to the compressor 100, to compress and forcibly expel any substance, such as liquid contained therein, out, as will described later. Accordingly, the air compressor acts to provide the cardiac simulator module 2100 with accurate simulation of cardio dynamic functions.

Figure 6:
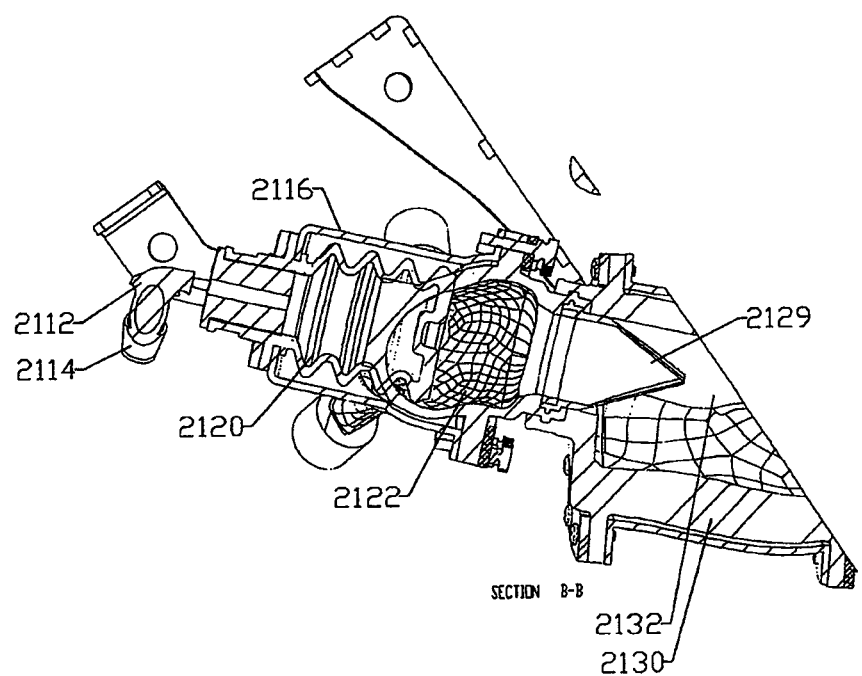
FIG. 6 is a partial cross-sectional view taken along lines 6A-6A of FIG. 4 showing the atrial compression mechanism, the atrial chamber, and the mitral valve.
Figure 7:
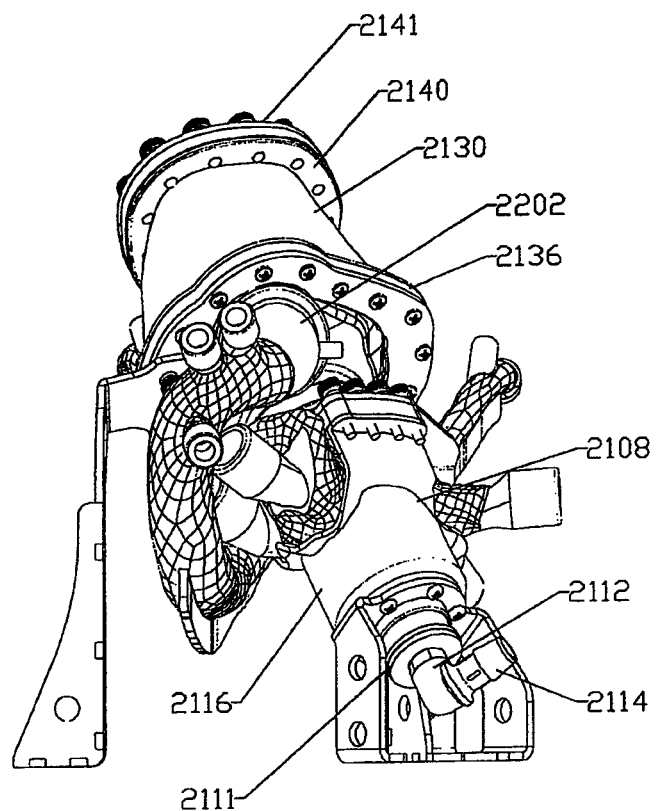
FIG. 7 is a back view of the cardiac simulator module illustrating the ventricular compression chamber, the aortic arch, and the atrial compression mechanism.

Pressurized air enters the left atrium assembly 2108 through the atrium pneumatic-in connector 2111 which is coupled to an elbow connection 2112 to tube barb 2114 for fitting to a tube, see FIG. 6 and FIG. 7. The left atrium assembly 2108 contains an outer air pneumatic support structure 2116 which is preferably fabricated from a hard, firm, clear cast plastic, such as urethane. Inside of the outer air pneumatic support structure 2116 is a flexible bellow assembly 2120, which is pneumatically connected to connection 2112 to tube barb 2114. Pneumatic pressure generated from the pneumatic modules, i.e. compressor 100, and pneumatically connected to the atrium pneumatic-in connector 2111 inflates the bellows. Additional injection ports may be included to provide a mechanism to inject dyes or representative medicine into various places within the cardiovascular simulator system 10. As the bellow assembly 2120 expands, it compresses a left atrium chamber 2122. The bottom ends 2124 and 2126 of the atrium outer air pneumatic support structure 2116 connect to plates 2228 and 2230, see FIG. 8.

The left atrium chamber 2122 is preferably made of a soft, flexible, clear silicone which is capable of contracting and expanding. To allow fluid flow into the left ventricle at the appropriate time, i.e. when the left atrium contracts, without fluid flowing back into the left atrium upon relaxation, the left atrium assembly 2108 contains a one way valve, illustrated herein as a synthetic valve 2129, see FIG. 6. The valve 2129 represents a mitral valve, and as an illustrative example, could be a synthetic replication. Alternatively, the valve may be a transplant of an actual mammalian mitral valve, such as a swine, or a human mitral valve.

Figure 4:
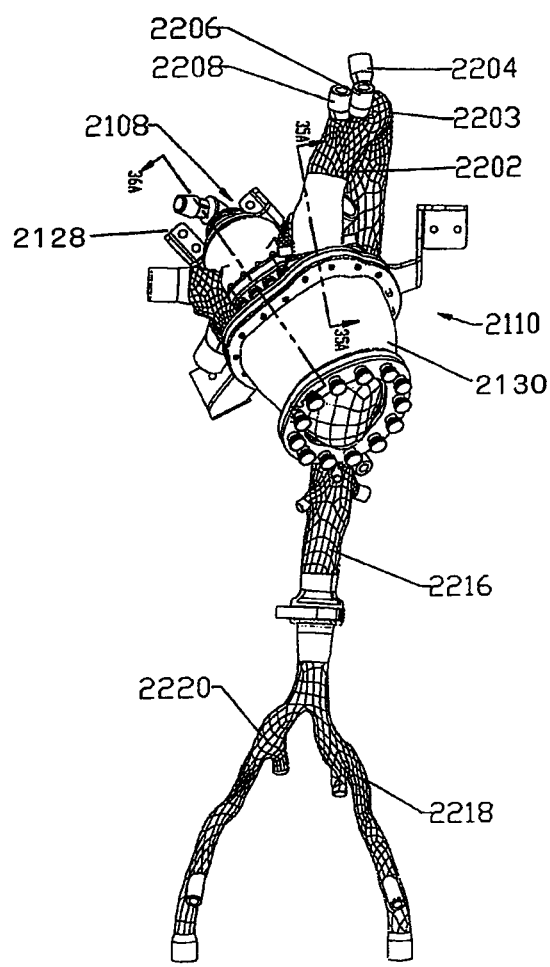
FIG. 4 is a partial perspective view of the cardiac simulator module and ventricular module.
Figure 5:
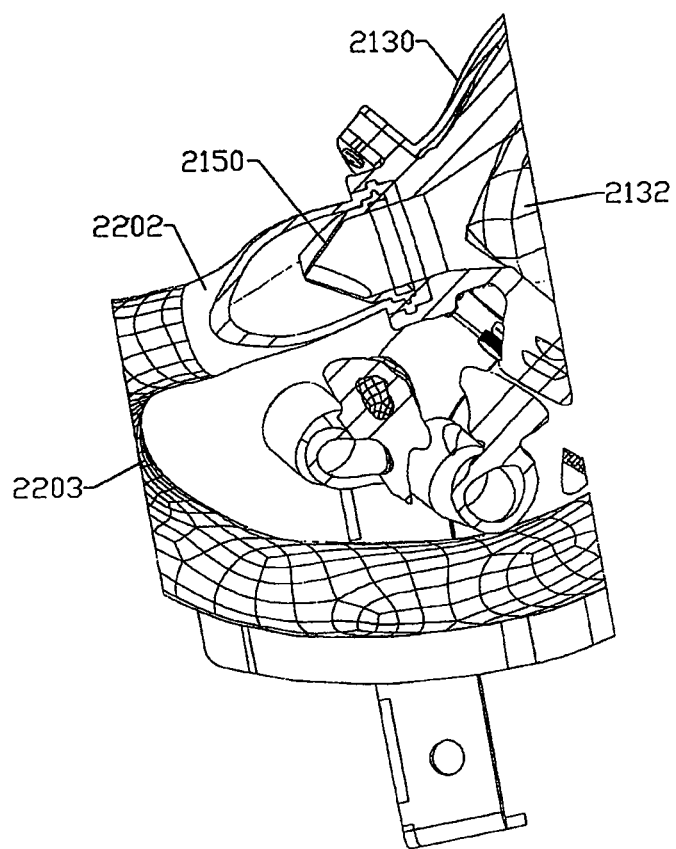
FIG. 5 is a partial cross-sectional view taken along lines 5A-5A of FIG. 4, showing an aortic valve and aortic arch.
Figure 8:
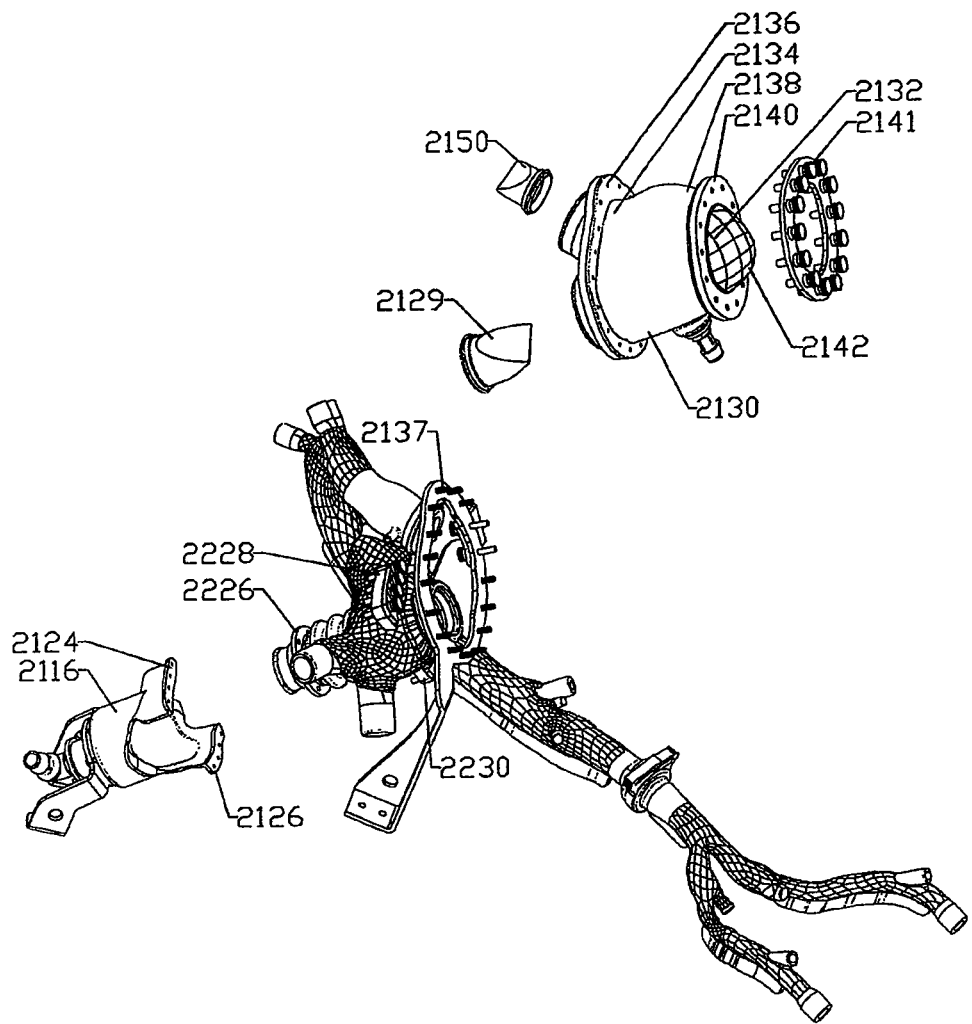
FIG. 8 is an exploded view of the cardiac simulator module.

The left ventricle module assembly 2110 is composed of a left ventricle pneumatic chamber 2130 which surrounds the left ventricle chamber 2132, see FIGS. 4, 6, and 8. The left ventricle pneumatic chamber 2130 is preferably fabricated from a hard, firm, clear cast plastic, such as urethane. The left ventricle chamber 2132 is preferably made of a soft, flexible clear plastic, such as silicone. A first end 2134 of the left ventricle pneumatic chamber 2130 contains a flange 2136 for connection to the left atrium assembly 2108, preferably to a cardiac support structure 2137. The second end 2138 of the left ventricle pneumatic chamber 2130 contains a second flange 2140. The second flange 2140 connects to a ring 2141 sized and shaped to encircle an apex 2142 of the left ventricle chamber 2132. In this embodiment, apex 2142 does not contract with the rest of the left ventricle chamber 2132. In an alternative embodiment, the apex 2142 is fully enclosed by the left ventricle pneumatic chamber 2130, see FIG. 10.

Figure 9:
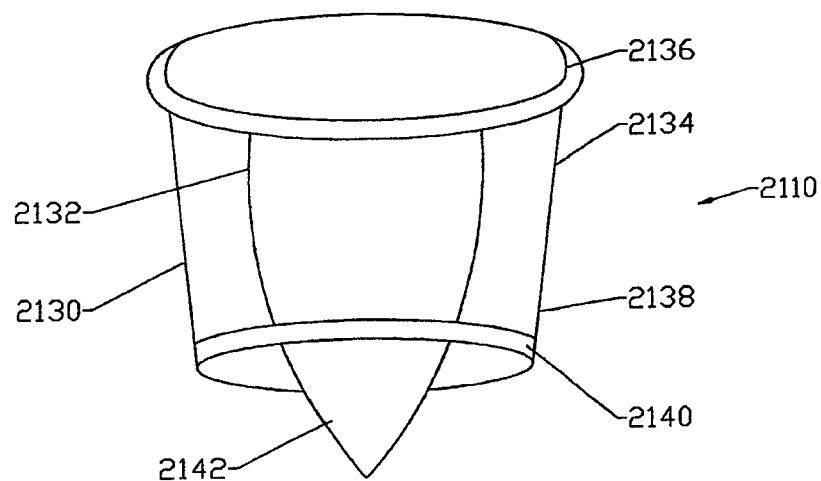
FIG. 9 is a side view of one embodiment of the ventricle and ventricle compression chamber.
Figure 10:
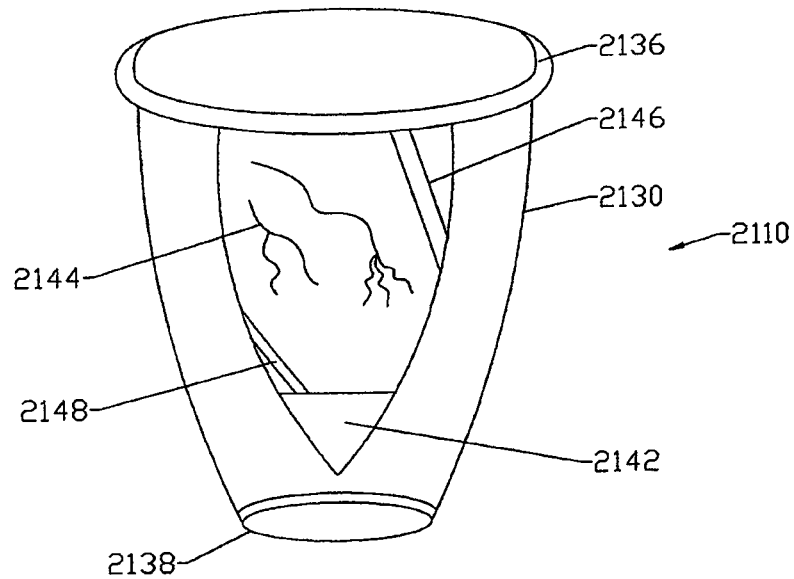
FIG. 10 is an alternative embodiment of the ventricular chamber and ventricle compression chamber.

As illustrated in FIG. 9, the left ventricle chamber 2132 does not include any vasculature. In an alternative embodiment, FIG. 10, the left ventricle chamber 2132 includes anatomically correct vasculature 2144, such as the left coronary artery, the left circumflex artery, the left marginal artery, the left anterior descending artery, and the diagonal branch of the left ventricle chamber 2132. The vasculature can be "normal" vasculature, or can be that of disease state vasculature. In addition, the normal or the disease state vasculature can be adapted to represent the exact vasculature of individual patients (through use of CT scans, MRI and/or rotational angiography) or can be designed to represent normal/disease states of non-patient specifically. Moreover, sections of the left ventricle chamber 2132 may include thick sections 2146 (simulating ventricular hypertrophy) and/or thinner sections 2148 (simulating ventricular hypotrophy) to simulate differing resistance of the heart to contraction and expansion, see FIG. 10. While not illustrated, such features may apply to the left atrium chamber 2122 as well. The left ventricle module 2110 is fluidly connected to one or more parts of the vasculature module 2200 through various connectors. For example, fluid flows out of the left ventricle into the vasculature module 2200 through a valve, illustrated herein as a synthetic aortic valve 2150, see FIG. 5. The synthetic aortic valve 2150 may be constructed from a synthetic plastic or from an animal, such as a swine/pig or human aortic valve. In either case, the valve 2150 is designed to allow fluid flow at the proper time in one direction, i.e. out of the left ventricle chamber 2132 and into the vasculature module 2200.

The vasculature module 2200 is made of a plurality of members, such as synthetic tubing, that provide fluid flow into and away from the cardiac simulator module 2100. Similar to the atrium and ventricle, the vasculature module 2200 tubing can be made to replicate the size, shape, and tonometry of the vasculature of specific patients. Preferably, the tubing is made of clear medical grade plastics having flexural modules, or stiffness, which corresponds to a desired need. Referring to FIGS. 4 and 7, fluid flows out of the left ventricle chamber 2132 and into tubing representing the aorta 2202 and aortic arch 2203. One or more aorta connectors, such as but not limited to, 2204 (subclavian artery), 2206 (right common carotid artery), and 2208 (brachiocephalic artery), are used to fluidly attach to other components of the vasculature module 2200, such as tubing representing the vertebral arteries 2210, and fluidly connect to the periphery organ/system module 2300 using tubing that represents the left common carotid artery and the right common carotid artery. Fluid further flows into the descending aorta 2216 and connects to tubing representing the right Iliac artery 2218 and the left Iliac artery 2220. Fluid flow out of the cardiac simulator module 2100 is directed through additional tubing depending on which part of the system the fluid is traveling.

Figure 11:
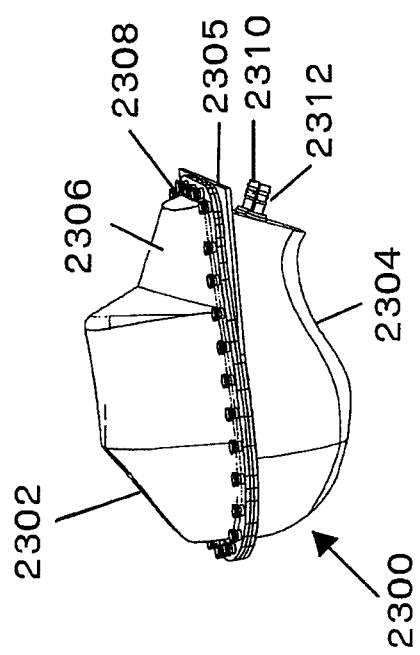
FIG. 11 is a perspective view of an illustrative example of the head unit.
Figure 12:
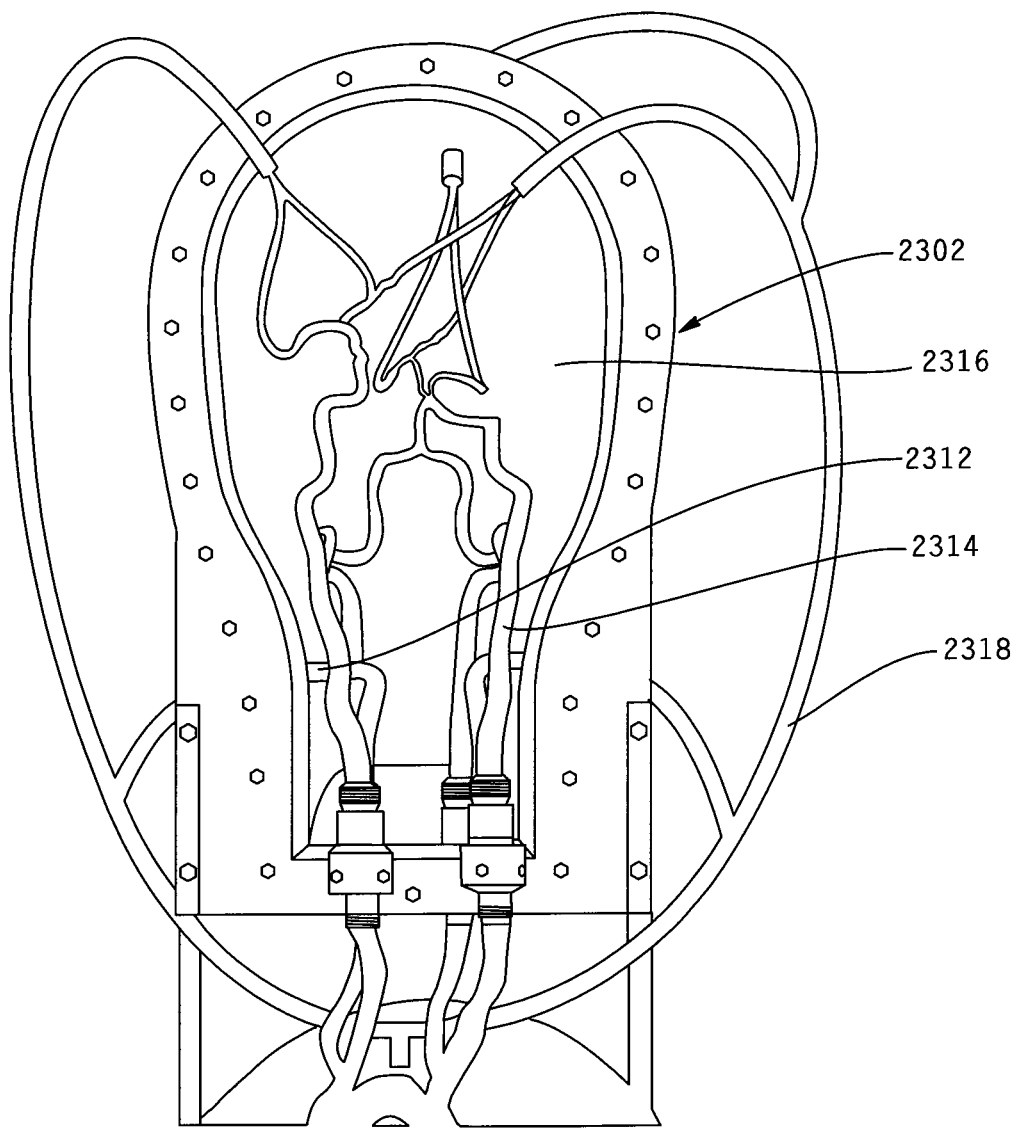
FIG. 12 is a perspective view of the head unit shown in FIG. 11, shown with cerebrovasculature.

Referring to FIGS. 11 and 12, the periphery organ/system module 2300 is shown as a head 2302. The head 2302 contains a bottom portion 2304 connected to a board 2305 and/or a top portion 2306 through fastening members 2308, such as screws or nuts. Such arrangement allows for the top portion 2306 to be removed and replaced. The bottom portion 2304 contains one or more fluid connectors 2310 and 2312 which are adapted to fluidly connect the head 2302 to one or more components of the vasculature module 2200. Such fluid connection allows the user to evaluate the effects of surgical techniques or procedures with peripheral organs or systems.

FIG. 12 shows an illustrative example of the head unit 2302 with a plurality of tubing, 2312 and 2314, representing the cerebrovasculature. The cerebrovasculature is placed within a gel like material 2316 in order to mimic the compliance of the vessels in the subarachnoid space and surrounding brain. The vasculature system, from the carotid bifurcation to the intracranial circulation, as well as any pathology can replicated. The head unit 2302 may also contain additional tubing 2318 connectable to other parts of the cardiovascular simulator system 10.

The cardiovascular simulator system 10 may use one or more compliance chamber modules. The compliance chamber modules act as system fluid storage devices and are adapted to functionally provide compensation for the fact that the entire vasculature system is not modeled. Accordingly, the compliance chamber provides an anatomically correct range of cardiac system compliance and compensation, given that the cardiovascular simulator system 10 does not replicate all vasculature vessels contained within the entire human cardiovasculature system. For example, vasculature to the lower extremities, particularly the legs, is generally not included as part of the vasculature module 2200. To replicate accurate cardio dynamics with anatomically accurate cardiac physiology while pumping into an incomplete modeled vascular system, the compliance chamber is used. The compliance chamber stimulates the vascular volume and tonometry of the non-molded parts of the system. The vascular tonometry simulates arterial tension and can be changed by adding or removing air from the compliance chamber. Depending on the amount of air, the conditions of hypertension or hypotension can be simulated.

Referring to FIGS. 1-3B, the compliance module is illustrated as an accumulator and referred to as the arterial compliance chamber 18. FIGS. 13-15 illustrate several embodiments of accumulators. FIG. 13 illustrates a gas charged accumulator 18A. Accumulator 18A comprises a housing unit 20 enclosing an internal cavity 22. Within the internal cavity 22 is a rubber bladder 24 for separating gas 26 (inserted through gas inlet 25) and any liquid stored within the internal cavity 22. A valve may be placed within the discharge port 30. FIG. 14 illustrates a gas charged accumulator using a piston, referred no as 18B. The accumulator 18B also has a housing unit 32 having an internal cavity 34. A piston 36 separates the gas and a liquid within the internal cavity 34. FIG. 15 illustrates a spring loaded piston accumulator 180. The spring loaded piston accumulator 180 also contains a housing unit 40 having an internal cavity 42. A piston 44 with a spring 46 operates similar to the gas charged piston, except that the spring 46 forces the piston against stored liquid. Although not illustrated, alternative accumulator types, such as an accumulator that uses a diaphragm, known to one of skill in the art, may be used as well. The fluid reservoir 12 may be configured as an accumulator as well.

Referring back to FIG. 1, fluid from the cardiac module 2100, directly, or if diverted to and returned from the arterial compliance chamber 18, is directed towards the anatomical module, including the vasculature simulator module 2200, and/or one or more peripheral organ/systems simulator module 2300 of the anatomical module 2000. Adjustment of flow rate can be accomplished by control mechanisms. For example, the flow rate for fluid entering the vasculature simulator module 2200 can be controlled by first resistance valve 48, also referred to as body resistance valve. Preferably, the resistance valve 48 is an electrically adjustable fluid resistance valve which includes a linear stepper motor and a globe valve. The resistance valve 48 can be automatically adjusted in order to achieve the desired flow rate to the body. The flow rate for fluid entering the one or more peripheral organ/systems simulator module, i.e. the head, can be controlled by a second resistance valve 50, also referred to as a head resistance valve. The second resistance valve 50 is preferably an electrically adjustable fluid resistance valve which includes a linear stepper motor and a globe valve. The resistance valve 50 can be automatically adjusted in order to achieve the desired flow rate to the head.

Each pathway, i.e. the vasculature pathway and the one or more peripheral organ/systems pathway, contains one or more monitoring or detecting mechanisms. As show in FIG. 1, the vasculature pathway includes a first flow meter 52, also referred to as a body flow meter. The body flow meter 52 may be, for example, a paddle wheel flow meter, configured to convert volumetric rate to an electrical signal. The signal is used by the system controller (to be described later) to determine when changes to the flow resistance valve settings are required in order to achieve the desired flow. The one or more peripheral organ/systems may include a second flow meter 54, also referred to as a head flow meter. The head flow meter 54 may also be a paddle wheel flow meter configured to convert volumetric flow rate to an electrical signal. The signal is used by the system controller to determine when changes to the second flow resistance valve 50 settings are required in order to achieve the desired flow. Fluid is then transported back to fluid reservoir 12. A check valve 56 ensures that the returning fluid flow enters into the fluid reservoir 12 while preventing backflow, i.e. reverse flow out of the fluid reservoir 12, replicating the actions of the anatomical veins.

Fluid may be drained from the cardiovascular simulator system 10 via a drain connector, such as a Schrader type quick disconnect valve 58. The valve 58 may be connected to drainage hose or tubing (not shown) attached during the draining cycle operation. The fluid is preferably drained into a container, shown as a fluid holding container or jug 60.

Referring to FIG. 2, the cardiovascular simulator system is shown with the pneumatics components. Air compressor 100 is responsible for several functions within the cardiovascular simulator system 10. Air compressor 100 provides pressurized air flow to the cardiac module 2100 through tubing 110 or 112. Specifically, pressurized air is supplied to the left atrium assembly 2108 and the left ventricle assembly 2110. Control of air flow into the cardiac simulator 2100, i.e. into the left atrium assembly 2108 or left ventricle assembly 2110 so as to allow each component to simulate a beating heart, is provided by one or more control mechanisms. Control of the left atrium assembly 2108 can be accomplished using a valve, illustrated on FIG. 2 as an actuation solenoid valve 114, also referred to as an atrium actuation solenoid valve. When the atrium actuation solenoid valve 114 is energized, pressurized air from compressor 100 is admitted into the bellows 2120 (FIG. 6). Such action compresses the left atrium assembly 2108. When the atrium actuation solenoid valve 114 is de-energized, pressure is released from the bellows, allowing the left atrium assembly 2108 to relax. A second actuation solenoid, referred to as a ventricle actuation solenoid valve 116 controls air into the left ventricle 2110. When the ventricle actuation solenoid valve 116 is energized, pressurized air from the compressor 100 is admitted into the left ventricle pneumatic chamber 2130 (FIGS. 4-10) that surrounds the left ventricle 2110. This action allows the left atrium 2110 to compress and push out any fluid within the left ventricle chamber 2132. When the ventricle actuation solenoid valve 116 is de-energized, pressure from the left ventricle pneumatic chamber 2130 is released, allowing the left ventricle 2110 to relax. Such actions simulate physiological contractions, and thus heartbeat, of the left side of the heart. The pressurized air may also cause one or more portions of the cardiac module, such as the left ventricle chamber 2132, to partially move about its axis to more accurately simulate the heartbeat.

The air compressor 100 may be fluidly connected to the arterial compliance chamber 18 via tubing 118 in order to reduce the water level in the arterial compliance chamber 18. To aid in draining fluid from within the cardiovascular simulator system 10, compressor 100 may be fluidly connected to the fluid reservoir 12 via tubing 120. Fluid can be drained via drain disconnect valve 58 pumping pressurized air through the venous chamber 12, as well as arterial chamber 18. Various control mechanisms for delivery of the pressurized air from the compressor 100 is preferably utilized. A valve, referred to as a venous chamber venting valve 122 is used to control the amount of air, and therefore the pressure, to the venous chamber 12. For example, manipulation of the venous chamber venting valve 122 to release air pressure from the venous chamber 12 may be used when the average venous pressure is determined to be too high. A second valve, referred to as a venous chamber pressurization valve 124 can be used to admit pressurized air into the venous chamber 12 in order to, for example, increase the baseline venous pressure. Manipulation of the venous chamber pressurization valve 124 may also be used during the drain cycle to force pressurized air through the cardiovascular simulator system 10. The pressurized air that is forced through the cardiovascular simulator system 10 drives the fluid out via the drain disconnect valve 58.

On the other side, or the simulation of the arterial chamber, various control mechanisms may be used as well. A valve, referred to as an arterial chamber venting valve 126 is designed to affect the hydraulics of the arterial compliance chamber 18. Manipulation of the arterial chamber venting valve 126 releases air pressure from the arterial compliance chamber 18. This has the effect of allowing more water to enter into the chamber, thereby reducing the air volume. This also has the effect of reducing the hydraulic compliance of the arterial compliance chamber 18. A second valve, the arterial chamber pressurization valve 128 can be used to control air flow into the arterial compliance chamber 18. Manipulation of the arterial chamber pressurization valve 128 admits pressurized air into the arterial compliance chamber 18. Admission of the pressurized air drives any fluid out of the arterial compliance chamber 18. As fluid is driven out, air volume increases within the arterial compliance chamber 18 and increases the compliance of the arterial compliance chamber 18. The arterial chamber pressurization valve 128 may further be used in the drain cycle to force pressurized air through the cardiovascular simulator system 10. As the pressurized air moves throughout the cardiovascular simulator system 10, any fluid within the cardiovascular system 10 is driven out through the drain disconnect valve 58.

Figure 3A:
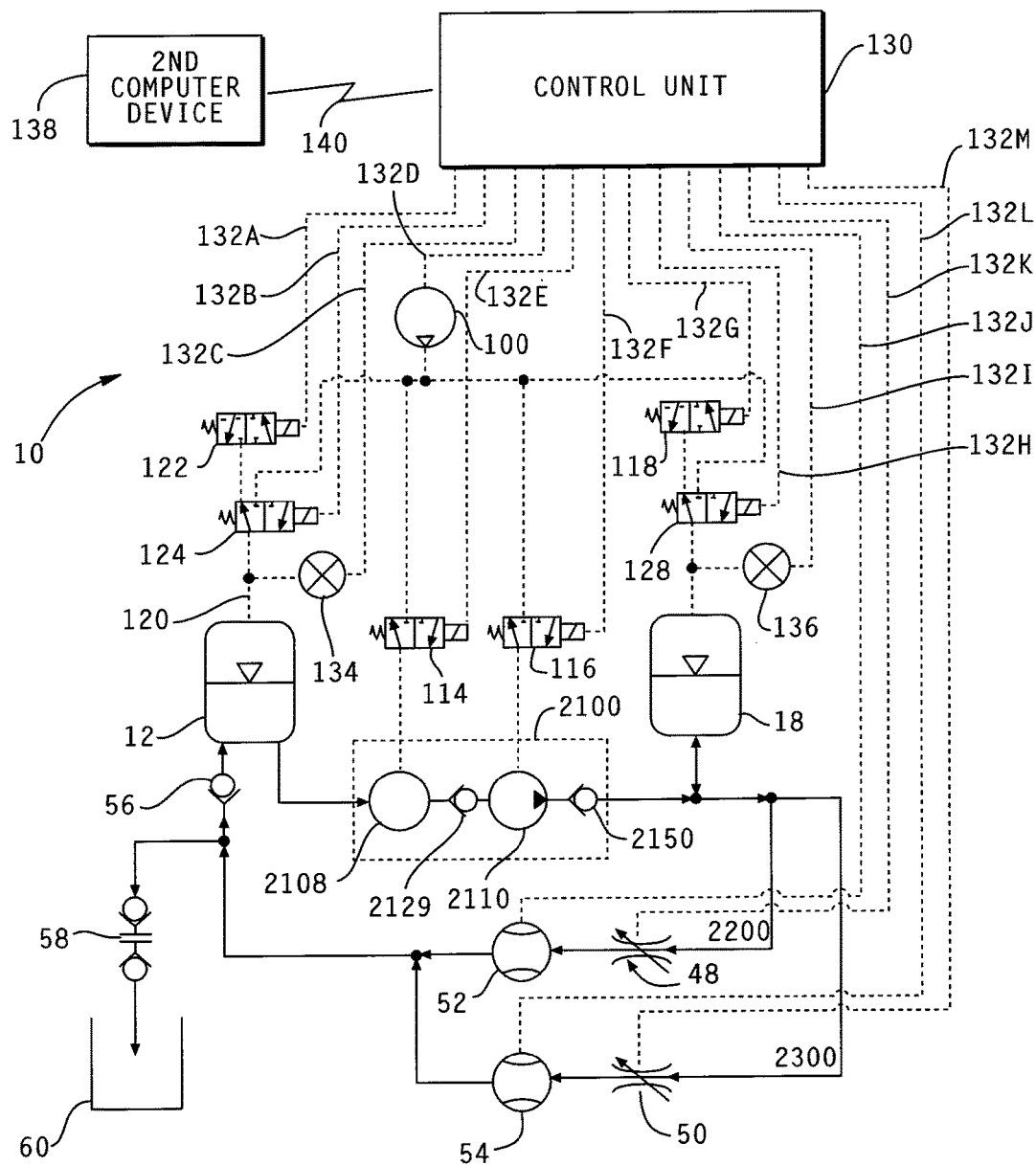
FIG. 3A is a block, diagram as shown in FIG. 2 including the electronic circuitry of the simulator system in accordance with an illustrative example of the present invention.
Figure 3B:
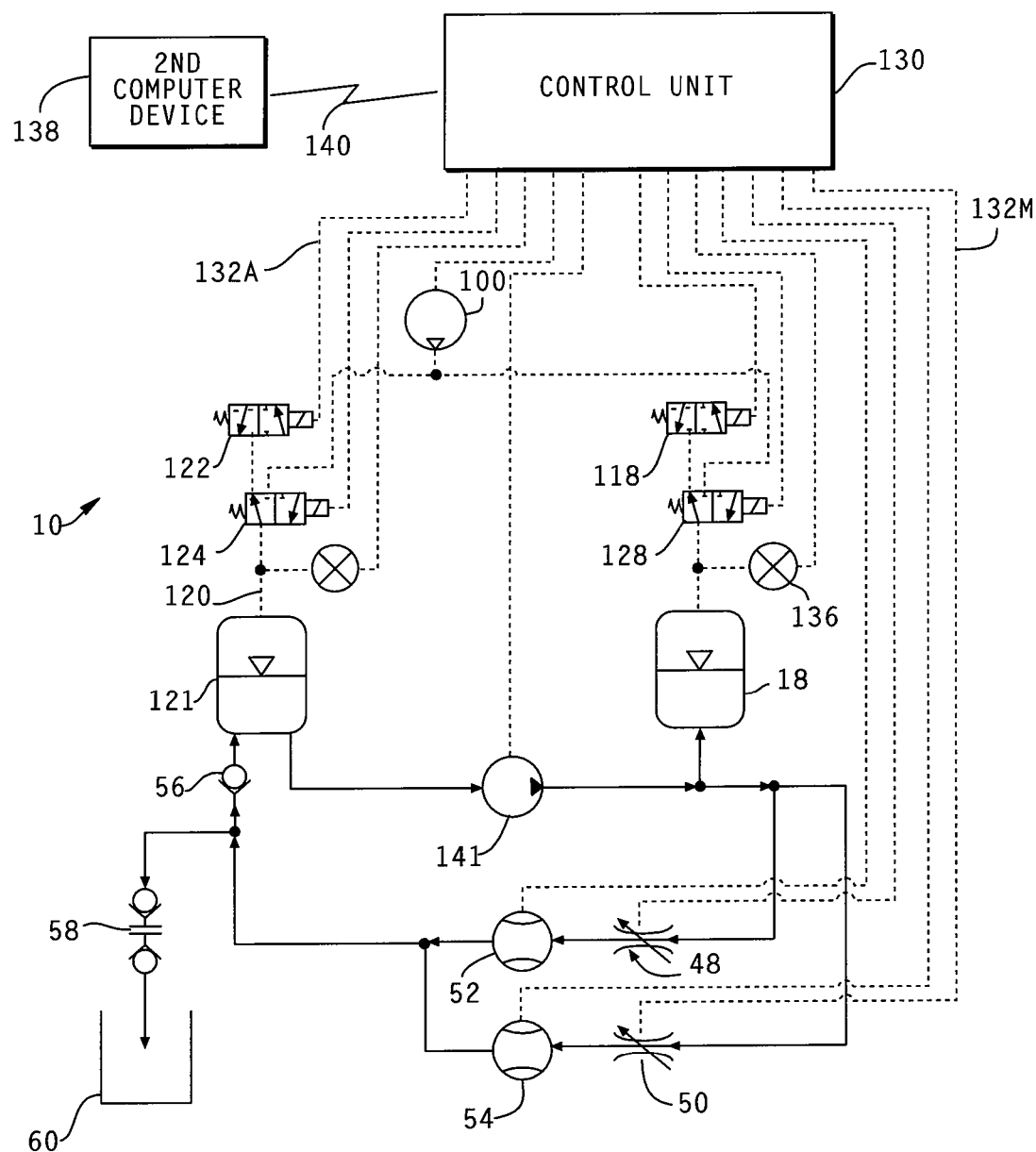
FIG. 3B is a block diagram showing an illustrative example of the present invention using a pump to represent the cardiac module.

The cardiovascular simulator system 10 is designed to allow for control of various parameters to be run automatically. Such control allows the cardiovascular system to function more efficiently and accurately in order to represent blood flow and/or other physical characteristics as required. Referring to FIG. 3A, a control unit 130 is electronically connected to various components of the cardiac system through connector members 132A-132M, referred generally as connector member 132. The connector member 132 may be wireless connection using, for example, blue tooth technology, or may be hardwired, such as computer cables using USB (Universal Serial Bus) connection. The control unit is preferably a computer having the necessary hardware for processing capability, storage capability and any necessary software to drive or control the functioning of various components, and may include, for example, logic boards such as printed circuit boards with the necessary integrated circuitry, central processing units, RAM, ROM, and/or hard drives. The control unit 130 must be designed to process various system parameters measured by the body flow meter 52 and the head flow meter 54. Additionally, the cardiovascular simulator system 10 may contain sensors 134 and 136. Sensor 134, also referred to as the venous pressure sensor, is a pressure sensor configured to convert gauge pressure reading of the fluid chamber 12 into an electrical signal. The signal can be transmitted to the system control unit 130 where a determination of adjustment to the fluid chamber 12 pressurization can be made. Sensor 136, also referred to as the arterial pressure sensor, is a pressure sensor configured to convert the gauge pressure reading of the arterial compliance chamber 18 into an electrical signal. The signal can be transmitted to the system control unit 130 where adjustment to the pumping action of the cardiac module 2100 to achieve various system pressures, i.e. to represent a predetermined systolic and diastolic pressure can be determined and/or made. The control unit 130 may further be configured to use command values to affect other system operations through, for example, control of 1) body flow resistance valve 48 settings, 2) head flow resistance valve 50 settings, 3) the speed profile of the compressor 100, 4) the timing and actuation of the atrium actuation solenoid, valve 114 and the ventricle actuation solenoid valve 116. In addition, the control unit 130 may be programmed to control the use of the compressor 100 in conjunction with the arterial chamber venting valve 126 and the arterial chamber pressurization valve 128 to modify levels of fluid in the arterial compliance chamber 18, thereby modifying the compliance. The control unit 130 may contain an information display, such as an LCD screen, to provide an interface with the user to allow for manipulation of one or more parameters.

A second computer device, illustrated as a tablet computer 138, may be used in conjunction with the control unit 130. The tablet computer 138 may contain the necessary hardware, such as a processor and memory, as well as the necessary software to provide a user interface to monitor one or more operations of the system and to adjust any settings. The tablet computer 138 may be electronically connected to the control unit 130 by wireless or hardwire connection 140. Preferably, the connection 140 is wireless, using, for example, blue tooth technology. However, the connection 140 may be via cable connections, such as cables using USB connection.

FIG. 3E illustrates the cardiovascular simulator system 10 in which the cardiac module 2100 uses an electrically driven pump 141. The pump 141 provides similar pulsatile flow characteristics as that of the anatomical heart model previously described. Such an embodiment could provide similar physiological pressure and flow characteristics with potentially lower cost, smaller size, higher reliability, or more controllable flow characteristics.

Referring to FIG. 16 (as well as FIGS. 4-10 when referring to specific components of the cardiac or vasculature modules), an illustrative embodiment of the cardiovascular simulator system 10 is shown. The cardiovascular simulator system 10 may include a support structure 142 which may be used to support the various components of the cardiovascular simulator system 10. Each of the components may be secured to the support structure using, for example, screws, nuts and bolts or may be secured using chemical fastening, such as an adhesive. Fluid stored within the fluid reservoir module 12 is passed through the system using the compressor 100 to push pressurized air into the fluid reservoir module 12. The action of the pressurized air allows the cardiac simulator module 2100 to function like a heart muscle of an human or animal by contracting and expanding, forcing fluid representing blood flow to travel within the vasculature simulator module 7300. The control unit 130 is designed to supply pulses of pressurized air the cardiac module 2100. Fluid pressures and fluid dynamics/flows are created by the pumping action of the cardiac module itself. The fluid is pushed out of fluid reservoir module 12 and enters the anatomical module 2000 which represents oxygenated blood returning from the lungs, not used in the presently described system, and flows into the left atrium assembly 2108 through tubing that represents the left and right pulmonary veins.

The atrium chamber 2122 fills with fluid and the pressure of the fluid, measured at the systolic side of the circuit, is controlled by the control unit 130 to be in the minimal normal range for diastolic pressure of a human heart (50-80 mm HG). The actual blood pressure of 120/80 (systolic/diastolic) obtained by the system is a combination function of the fluid flow volume (simulated by manipulation of the control unit 130 in relationship to the cardiac simulator module), the cardiac simulated heart rate, arterial compression, ventricular compression (or ejection fraction, simulated as the amount of fluid ejected out of the atrium chamber or ventricle chamber), the capillary resistance (simulated effects by the manipulation of the compliance chamber 18) and the vascular tonometry or tension (simulated effects by the manipulation of the compliance chamber 18).

The cardiovascular simulator system 10 is designed to independently adjust for systolic and diastolic values using various combinations of parameters which affect the systolic and diastolic numbers to varying degrees. The value of the diastolic pressure can be manipulated to above or below the normal ranges to simulate various disease states using the control module. In addition to any of the components described previously, the control unit 130 is shown having one or more circuit boards, illustrated herein as a control printed circuit board (PCB) 144 and a second PCP 146 for control of voltage sensing. A power source 143, which may include a battery, powers the entire cardiac simulator system 10. Initiated by the control module 130, the left atrium is contracted. Contraction of the left atrium is controlled by the compressor 100 which controls when and how much pressurized air is forced into the left atrium chamber 2128. The pressurized air generated flows through tubing and enters the outer air pneumatic support structure 2116 of the left atrium chamber 2122. The air causes the atrium bellows 2120 to compress against, the left atrium chamber 2122, reducing the volume within the left atrium chamber 2122. Reduction of the volume results in fluid being expelled through the mitral valve 2129 and into the left ventricle pneumatic chamber 2130.

The pressurized air generated travels through the tubing of the vasculature module into the left ventricle pneumatic chamber 2130. The pressurized fluid causes a reduction of volume within the left ventricle chamber 2132, resulting in the expulsion of fluid through the synthetic aortic valve 2150 and into the aortic arch 2203. Because of the feedback systems utilized, the cardiovascular simulator system is configured to regulate various physiological parameters. The pressure of the fluid can be set, for example, within the range of normal physiological representative systolic/diastolic pressures. For example, the cardiovascular simulator system 10 may include set points of: 1) default 120 mmHg representing systolic pressure, 2) default 80 mmHg, representing diastolic pressure, 3) default 10 mmHg, representing venous pool pressure, 4) blood flow of, default 12 mL/second, representing the average cephalic flow (total head flow), 5) blood flow, default 20 mL/second, representing the average thoracic flow (abdominal aorta, no internal organs), and 6) fluid temperature, default 98.6 degrees Fahrenheit. These values or set points may also be changed to represent non-normal values. The physiological parameter set points are adjustable by a user. In addition, the system uses the feedback controls to automatically compensate for changes in the set points.

The conditions can be manipulated by the control unit 130 to change the corresponding pressure, volume flow rate, ejection fraction, or combinations thereof as the fluid moves through the entire system. The fluid ejected from the left ventricle chamber is under pressure and flows through tubing which represents or simulates various portions of the ventricle anatomy, such as the vertebral arteries, the left common carotid artery, and the right common carotid artery. Fluid also flows down to the descending aorta and into the right iliac artery and the left iliac artery. As such, cardiovascular simulator system 10 is configured regulate the average of systolic and diastolic pressure by adjusting the volume of pressurized air produced by the compressor 100 and used to compress the atrium and ventricle. Time varying air flow rates within a cycle (as opposed to constant flow) is preferably generated. Regulation of the pressure difference between representative systolic and diastolic pressures are accomplished by adjusting the volume of air (and thus the hydraulic compliance) of the arterial compliance chamber 18. Adjusting the resistance valves provides regulation of the representative cephalic and thoracic flow. The flow meters are preferably positioned in the representative venous portion of the system rather than the representative arterial portion. Therefore, flows are more continuous than pulsatile at that point and adjustments to average flow rates, rather than ejection fractions and peak flow rates, can be used. With regards to the heating of the fluid, heater surface temperature and replicator fluid temperature can be determined and controlled via, the control unit 130 to heat the fluid to the desired temperature, while ensuring that the heater surface temperature does not exceed a predefined limit.

Eventually all fluid is directed back to the fluid reservoir 12 in which the flow rate is adjusted. Vascular tension can be simulated and adjusted through several mechanisms, such as through the use of compliance and resistance valves, and through the molded vasculature simulator module representing the arteries having various durometer values. Although not illustrated, fluid flow may be directed to the periphery organ/system module, i.e. the head 2302 and its representative vasculature tubing. If used as part of the cardiac simulator system 10, the head 2302 may be secured to the support structure frame 142 through the head support structure 150. The head 2302 may contain a quick connect connector to quickly and easily connect/disconcert to/from the support structure frame 142 and can be capable of angular translation. Fluid is then returned to the tubing representing the pulmonary anatomy and eventually back into cardiac module 2100 to start a new cycle.

The body resistance valve 48, the head resistance valve 50, the body flow meter 52 and the head flow meter 54 may be housed in housing a structures 152, 154, 156, and 158. The compliance adjusting valves, such as the venous chamber venting valve 122, the venous chamber pressurization valve 124, the arterial chamber venting valve 126, and/or the arterial chamber pressurization valve 128 may be stored in housing structure 160.

As described previously, abnormal heart conditions can be simulated by varying the force, duration, and frequency of the air burst generated by the atrium/ventricle assemblies through commands sent from the control unit and adjustments to various structures within the system to cause such changes to occur.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for simulating the cardiovascular system of a human or other mammal in which one or more operational parameters are automatically controlled without the need for manual adjustments comprising:
   a computer based control unit operatively coupled to a closed loop pneumatic feedback circuit configured to generate or move pneumatic fluid through said system and a closed loop hydraulic feedback circuit configured to move hydraulic fluid through said system, said closed looped pneumatic feedback circuit or said closed looped hydraulic feedback circuit is operatively connected to a cardiac system module comprising an atrial actuator and a ventricle actuator; said computer based control unit configured to receive or process data obtained from sensors placed within said system and cause at least one component of said atrial actuator or said ventricle actuator to function based on said data received or processed;
   at least one sensor placed within said system is configured to detect or respond to changes in one or more parameters of said closed loop pneumatic feedback circuit;
   at least one sensor placed within said system is configured to detect or respond to changes in one or more parameters of said closed loop hydraulic feedback circuit;
   said atrial actuator comprising a rigid outer casing sized and shaped to house a pressurized air delivery device therein and fluidly connected to a flexible, fluid filled inner chamber, said flexible, fluid filled inner chamber constructed and arranged to contract when a pressurized fluid is exerted thereupon, thereby causing said fluid stored within to be ejected out, and expand when said pressurized fluid is removed, and
   said ventricle actuator comprises an irregularly shaped, flexible ventricle assembly inner member having said fluid stored within and surrounded by a rigid ventricle assembly outer member, said ventricle assembly inner member and said rigid ventricle assembly outer member being separated by a space therebetween, whereby pressurized fluid inserted within said space exerts a force upon said flexible ventricle assembly inner member, causing said flexible ventricle assembly inner member to eject said fluid stored within;
   said control unit providing physiologically accurate representation of a cardiovasculature system in normal or diseased states whereby one or more operational parameters are automatically controlled without the need for manual adjustments.

2. The system for simulating the cardiovascular system of a human or other mammal in which one or more operational parameters are automatically controlled without the need for manual adjustments according to claim 1 further including at least one resistance valve configured to adjust a flow rate of a fluid within said system.

3. The system for simulating the cardiovascular system of a human or other mammal in which one or more operational parameters are automatically controlled without the need for manual adjustments according to claim 2 wherein said at least one resistance valve is an electrically adjustable fluid valve.

4. The system for simulating the cardiovascular system of a human or other mammal in which one or more operational parameters are automatically controlled without the need for manual adjustments according to claim 1 wherein said control unit is configured to control timing or speed of generation of pressurized air within said system.

5. The system for simulating the cardiovascular system of a human or other mammal in which one or more operational parameters are automatically controlled without the need for manual adjustments according to claim 1 where said closed loop pneumatic feedback circuit or said closed loop hydraulic feedback circuit is further operatively connected to a vasculature system module comprising at least one tubing adapted to have characteristics of a human or other mammal artery or vein and fluidly connected to at least a portion of said cardiac system module.

6. The system for simulating the cardiovascular system of a human or other mammal in which one or more operational parameters are automatically controlled without the need for manual adjustments according to claim 5 further including a head module, said head module comprising a plurality of tubing suspended in a gel like material and fluidly connected to said cardiac system module or vasculature system module.

7. The system for simulating the cardiovascular system of a human or other mammal in which one or more operational parameters are automatically controlled without the need for manual adjustments according to claim 6 further including at least one resistance valve configured to adjust a flow rate of said fluid entering said head module.

8. The system for simulating the cardiovascular system of a human or other mammal in which one or more operational parameters are automatically controlled without the need for manual adjustments according to claim 1 further including at least one flow meter configured for converting volumetric flow rate of a fluid not associated with a head region to an electrical signal or at least one flow meter configured for converting volumetric flow rate of fluid associated with said head region to an electrical signal.

9. The system for simulating the cardiovascular system of a human or other mammal in which one or more operational parameters are automatically controlled without the need for manual adjustments according to claim 1 further including a pneumatic supply device fluidly connected to at least a portion of said atrium actuator and to at least a portion of said ventricle actuator and configured to provide pressurized or compressed air.

10. The system for simulating the cardiovascular system of a human or other mammal in which one or more operational parameters are automatically controlled without the need for manual adjustments according to claim 1 further comprising a fluid reservoir configured to receive or store said hydraulic fluid therein.

11. The system for simulating the cardiovascular system of a human or other mammal in which one or more operational parameters are automatically controlled without the need for manual adjustments according to claim 1 further comprising a heating device configured to heat a fluid within said system.

12. The system for simulating the cardiovascular system of a human or other mammal in which one or more operational parameters are automatically controlled without the need for manual adjustments according to claim 1 wherein said fluid is adapted to have characteristics of blood.

13. The system for simulating the cardiovascular system of a human or other mammal in which one or more operational parameters are automatically controlled without the need for manual adjustments according to claim 1 further comprising a second computer device operatively connected to said computer based control unit.

14. The system for simulating the cardiovascular system of a human or other mammal in which one or more operational parameters are automatically controlled without the need for manual adjustments according to claim 13 wherein said second computer device is wirelessly linked to said computer based control unit.

15. The system for simulating the cardiovascular system of a human or other mammal in which one or more operational parameters are automatically controlled without the need for manual adjustments according to claim 1 wherein said flexible atrium assembly inner member is anatomically modeled after an atrium of a patient.

16. The system for simulating the cardiovascular system of a human or other mammal in which one or more operational parameters are automatically controlled without the need for manual adjustments according to claim 1 wherein said flexible ventricle assembly inner member is anatomically modeled after a ventricle of a patient.

17. The system for simulating the cardiovascular system of a human or other mammal in which one or more operational parameters are automatically controlled without the need for manual adjustments according to claim 1, wherein said at least one sensor configured to detect or respond to one or more parameters of said closed loop pneumatic feedback circuit or said at least one sensor configured to detect or respond to one or more parameters of said closed loop hydraulic feedback circuit monitors temperature, pressure, or flow within said system to achieve physiologically representative cardiovasculature characteristics of a human or mammal.

18. The system for simulating the cardiovascular system of a human or other mammal in which one or more operational parameters are automatically controlled without the need for manual adjustments according to claim 1, wherein said operational parameters of said system controlled or modified by said computer based control unit is a simulated heart rate, a simulated blood pressure, a simulated ejection fraction, a simulated systemic vascular resistance or compliance, a simulated system temperature, or combinations thereof.

19. The system for simulating the cardiovascular system of a human or other mammal in which one or more operational parameters are automatically controlled without the need for manual adjustments according to claim 1, further including a compliance chamber adapted to simulate vasculature compliance in normal or diseased states, said compliance chamber comprising an enclosed storage reservoir having a movable barrier separating a non-compressible fluid on a first side and a compressible fluid on a second side.

20. The system for simulating the cardiovascular system of a human or other mammal in which one or more operational parameters are automatically controlled without the need for manual adjustments according to claim 19 wherein said control unit is operatively connected to said compliance chamber.

21. The system for simulating the cardiovascular system of a human or other mammal in which one or more operational parameters are automatically controlled without the need for manual adjustments according to claim 19, wherein said movable barrier is flexible.

22. The system for simulating the cardiovascular system of a human or other mammal in which one or more operational parameters are automatically controlled without the need for manual adjustments according to claim 19, wherein said movable barrier is a piston.

23. The system for simulating the cardiovascular system of a human or other mammal in which one or more operational parameters are automatically controlled without the need for manual adjustments according to claim 19, wherein said movable barrier is a diaphragm.

* * * * *